(12) United States Patent
Anderson

(10) Patent No.: US 11,531,672 B1
(45) Date of Patent: Dec. 20, 2022

(54) COMPUTERIZED SYSTEM AND METHOD FOR ELECTRONICALLY SYNCHRONIZING WORK STATION SESSIONS OVER A NETWORK

(71) Applicant: Bat City Labs, LLC, Austin, TX (US)

(72) Inventor: Kristopher Lance Anderson, Austin, TX (US)

(73) Assignee: Bat City Labs, LLC, Bee Cave, TX (US)

( * ) Notice: Subject to any disclaimer, the term of this patent is extended or adjusted under 35 U.S.C. 154(b) by 298 days.

(21) Appl. No.: 15/133,404

(22) Filed: Apr. 20, 2016

Related U.S. Application Data

(63) Continuation of application No. 15/017,425, filed on Feb. 5, 2016, now abandoned.

(60) Provisional application No. 62/112,635, filed on Feb. 5, 2015.

(51) Int. Cl.
*G06F 16/2455* (2019.01)
*G06F 16/27* (2019.01)
*H04L 67/142* (2022.01)
*H04L 67/10* (2022.01)

(52) U.S. Cl.
CPC ...... *G06F 16/24565* (2019.01); *G06F 16/275* (2019.01); *H04L 67/10* (2013.01); *H04L 67/142* (2013.01)

(58) Field of Classification Search
CPC ........... G06F 17/3051; G06F 16/24565; G06F 16/275; H04L 67/10; H04L 67/142
See application file for complete search history.

(56) References Cited

U.S. PATENT DOCUMENTS

| | | | | |
|---|---|---|---|---|
| 6,044,475 A | * | 3/2000 | Chung et al. | ....... G06F 11/1438 714/15 |
| 6,182,198 B1 | * | 1/2001 | Hubis et al. | ........ G06F 11/1662 711/162 |
| 2003/0046307 A1 | * | 3/2003 | Rivette | ................... G06F 16/34 707/E17.093 |
| 2005/0027795 A1 | * | 2/2005 | San Andres | ...... H04L 29/12113 709/249 |
| 2010/0115334 A1 | * | 5/2010 | Malleck | .................. G06F 9/485 714/15 |
| 2012/0167117 A1 | * | 6/2012 | Kekeh | ..................... G06F 9/485 719/318 |
| 2014/0359637 A1 | * | 12/2014 | Yan | ....................... G06F 9/4881 718/108 |

(Continued)

*Primary Examiner* — Cam Y T Truong
(74) *Attorney, Agent, or Firm* — Kristopher Lance Anderson

(57) ABSTRACT

Disclosed are systems and methods for improving file and application management supported by or configured with an installed application program or platform running the client's device or on the cloud (or on a server). The present disclosure describes computer systems and methods for an application that provides a single-touch/input, session management function that allows a user to store all desired information related to open files and programs. The desired information also includes status information related to the open files and programs, whereby a user can "pause" working on the files/programs by closing the files/programs, and when executing the disclosed application, the previous status of the files/programs can be reloaded, enabling the user to continue working seamlessly.

10 Claims, 15 Drawing Sheets

(56) References Cited

U.S. PATENT DOCUMENTS

2016/0065626 A1* 3/2016 Jain .................. G06Q 10/10
709/205
2017/0124039 A1* 5/2017 Hailpern ............ G06F 3/04842

* cited by examiner

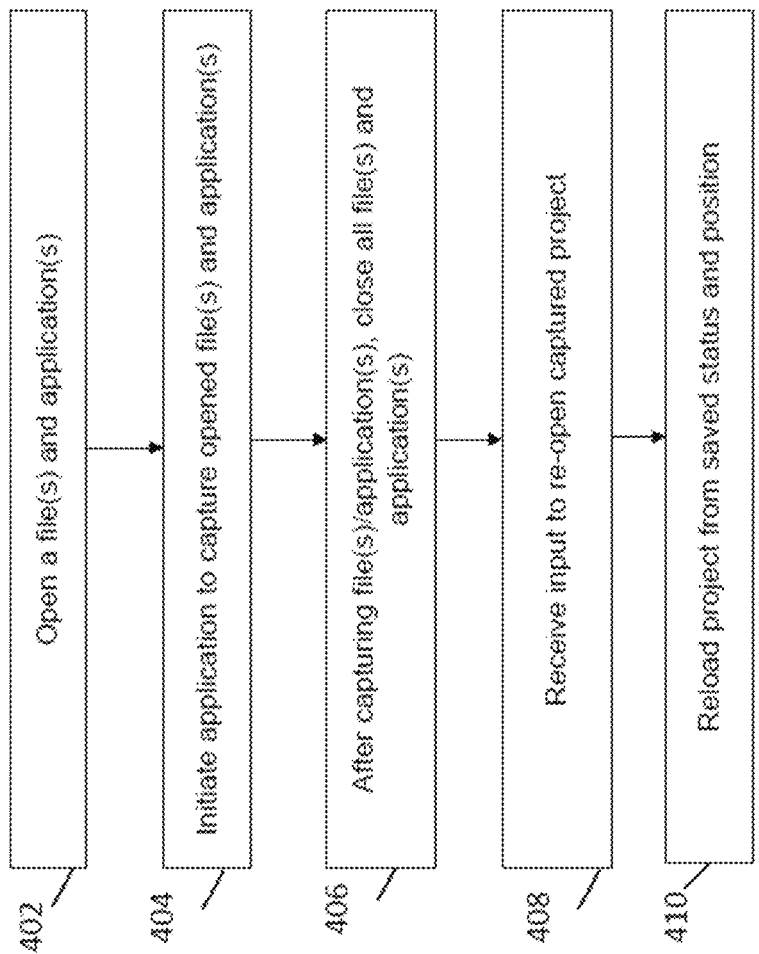

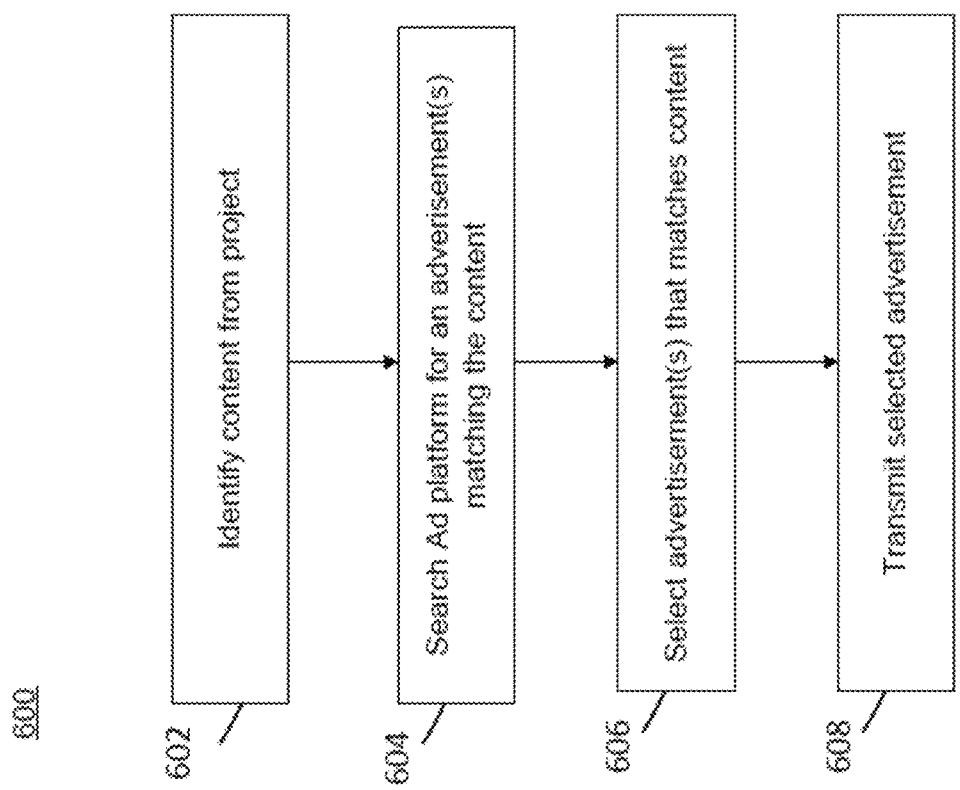

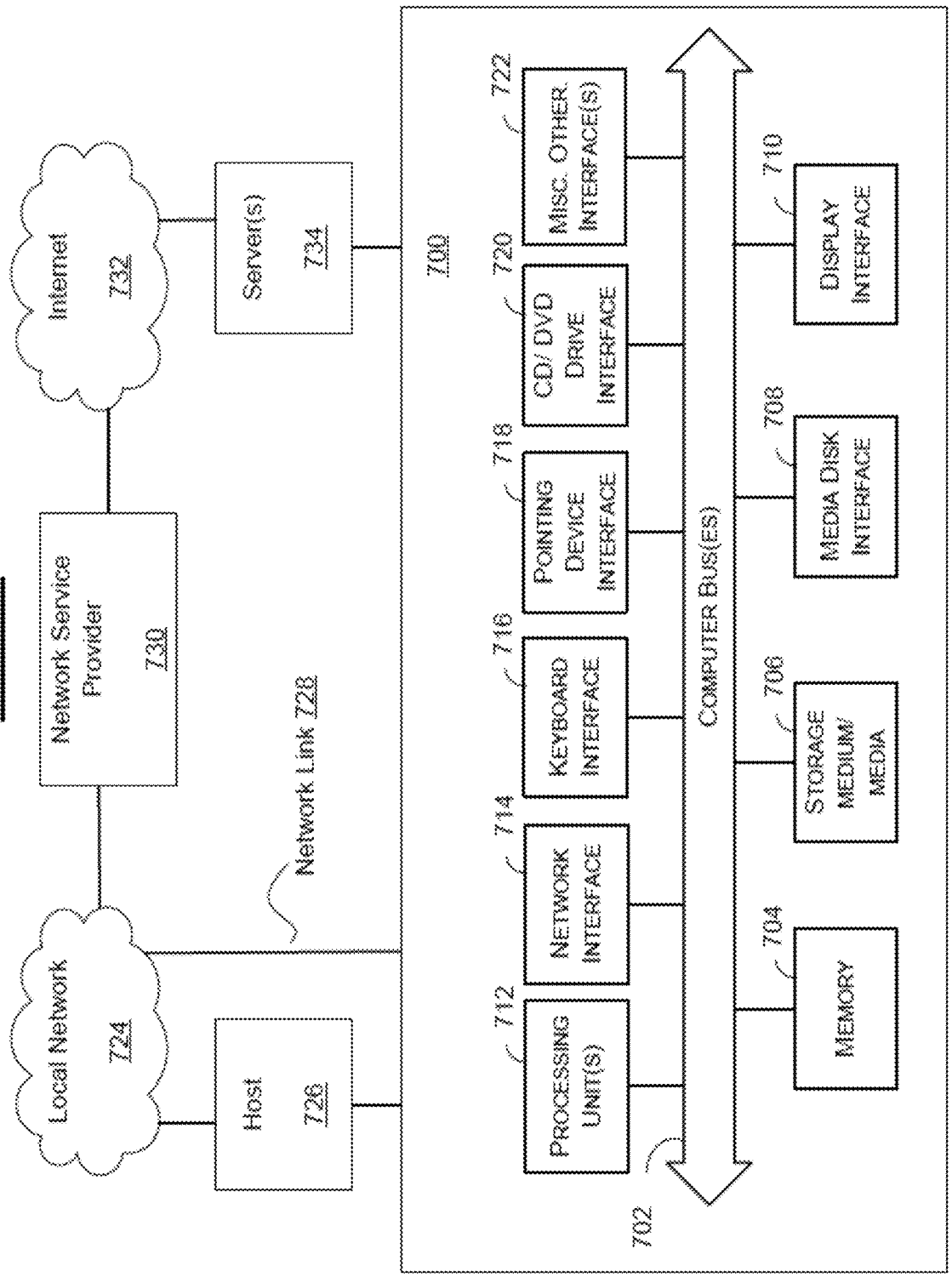

COMPUTERIZED SYSTEM AND METHOD FOR ELECTRONICALLY SYNCHRONIZING WORK STATION SESSIONS OVER A NETWORK

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of applications and systems and/or platforms programmed to work in concert with application programs, systems and platforms.

CROSS-REFERENCE TO RELATED APPLICATIONS

This application claims the benefit of priority of U.S. Patent Application No. 15/017,425, filed on Feb. 5, 2016, which claims priority under 35 U.S.C. 119(e) of U.S. Provisional Patent Application No. 62/112,635 filed on Feb. 5, 2015, which are incorporated herein by reference in their entirety.

SUMMARY

The present disclosure describes computer systems and methods for an application (also referred to as a program) or application platform that provides a project session management function that allows a user to store all desired information related to open files and programs. That is, the present disclosure involves an application that can store all the information that a user is currently using. Such information can be stored locally on the computer the user is currently working on. In some embodiments, the information related to the open files and programs on the server, or on the cloud, for remote retrieval. The remote/cloud based functionality can enable the user to begin working on and with the files and documents at a location remote from the previous workstation/work-environment. According to some embodiments, the files and application information that is stored in the applications datastore (store either locally or on the server/cloud), can be attributed to a particular project, or can include all work product/information the user is working on, as seen from the below discussion.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for application management.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a flowchart illustrating steps performed in accordance with some embodiments of the present disclosure;

FIG. 6 is a flowchart illustrating steps performed in accordance with some embodiments of the present disclosure;

FIG. 7 is a block diagram illustrating architecture of a hardware device in accordance with one or more embodiments of the present disclosure.

DESCRIPTION OF EMBODIMENTS

Figure 1:
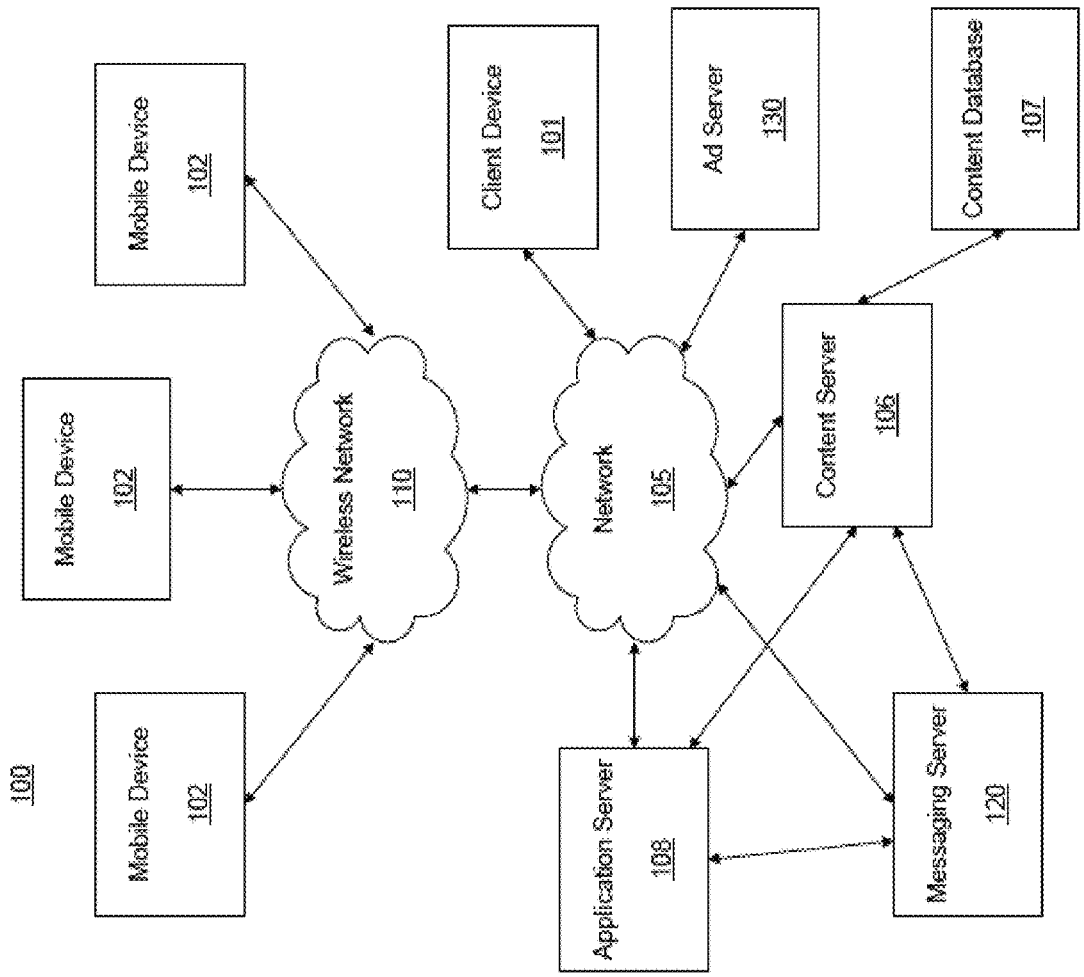
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11 b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. The present disclosure describes computer systems and methods for an application (also referred to as a program) or application platform that provides a single-touch/input, session management function that allows a user to store all desired information related to open files and programs. That is, the present disclosure involves an application that can store all the information that a user is currently using. Such information can be stored locally on the computer the user is currently working on. Embodiments also exist where the information related to the open files and programs on the server, or on the cloud, for remote retrieval. The remote/cloud based functionality can enable the user to begin working on and with the files and documents at a location remote from the previous workstation/work-environment.

According to some embodiments, the files and application information that is stored in the applications datastore (store either locally or on the server/cloud), can be attributed to a particular project, or can include all work product/information the user is working on, as seen from the below discussion. Indeed, embodiments exist where the information saved by the instant disclosure's application can include data and/or metadata related to, but not limited to, any type of files, such as, but not limited to, media, voice, SMS, MMS, audio, video, multi-media, text, and the like. Such information can include, but is not limited to, the content of each file, the position within the document the user last traversed to, and/or any notes/edits the user made within the file, and the like. The information can also application or program information related to the programs executing the files, such as, but not limited to, a word processing program, media rendering program and the like.

By way of a non-limiting example, according to some embodiments of the present disclosure, a user is working on a project. The user is composing work product while referring to multiple references represented as Adobe®, Microsoft Word®, Microsoft Excel® and internet browser windows (e.g., Microsoft Internet Explorer®, Firefox®, Google Chrome®, and the like). Multiple windows are open during the session, providing the user with varying resources to compile into a current work product. Upon reaching the end of the session, the user is typically forced to save and close all of the open documents and applications in order to shut down the computer. While some features, such as Hibernate, or Sleep mode, may allow for programs to remain open, many enterprise settings have standard restart policies (or overnight system resets required by certain employers) which may disrupt the period of sleep or hibernation and will close the file.

Having to shut down multiple windows, tabs, documents, spreadsheets, templates, presentations and explorer folders at the end of each day or work session can be problematic. The worker has opened all of the files in order to compile information for a deliverable, such as an article, presentation, contract, or other work product. There may be several web browser windows or tabs open providing internet content for reference. Prior documents or other exemplary documentation may be referred to in the form of adobe .PDF files. Template documents, draft versions, and the final product may be in the form of Microsoft Word. Several Windows Explorer or Finder folders may also be open for access to files, photos, or other documents relevant to the project. With modern computing power, there may be literally dozens of documents and windows open for any particular working session or project. All of these programs must be closed, saved, and more importantly, remembered to ensure the user can resume the project without a loss of time and efficiency.

At the end of the workday, or session, rather than having to shut down and close all files individually, the user can implement the disclosed application to catalog and inventory all open files. The disclosed application will populate a list of all open programs and the documents associated therewith. The list will be confirmed by the user and attributed a session name. The user may select all or some of the open files/windows. A default session name may be populated by the disclosed application to provide a time-stamp or other standard file naming convention where the user may access the list of recent sessions logged by the disclosed application and determine the applicable setting. The user can associate preferred naming conventions such as "Company Business Plan, [date]" or "Research Project" to provide additional reference to the session.

Upon returning to the project, whether it is the next morning upon arriving to work, returning to a previous project after being pulled into other matters, or upon restarting a laptop at another location, the user may again implement the disclosed application to populate a list of save projects or sessions. The sessions may be sorted by name, client, project, or chronological order. The session is selected and the disclosed application then re-populates the computing device with all selected closed files with the intent of completely restoring the user's environment at the end of the previous session. This includes saved versions of all document and files, as well as re-launched tabs and windows of various browsers that were open. Clipboards may even be retained. The pages will be reloaded and presented, subject only to changes to such pages or restrictions due to log-in or other security requirements. In essence, the computer is restored to the prior state when the project was last being worked on.

There are existing features of various computer operating systems and programs which attempt to accomplish the same thing. However, these are often limited to the specific program or application, and are not meant to seamlessly operate across all computer programs and processes. Some will open the program, but not the specific domain or document being worked on at the time. Auto-recovery or auto-saved documents may be accessed, but these again are on an individualized basis and not a compilation of a user's open items during a particular project.

According to some embodiments, the disclosed systems and method can also be monetized. That is, according to some embodiments, as discussed in more detail below, the disclosed systems and methods (i.e., the disclosed application) can effectuate increased user engagement in files by enabling a user the ability to continually access information which the user has evidenced an interest in, which can lead to increased monetization opportunities through higher click-through-rates (CTRs) and increased return-on-investment (ROI), revenues, salience and relevance of served advertisements, as discussed in more detail below. That is, in some embodiments, content from the files the user is rendering can be extracted and can be used for monetization purposes, where targeted advertisements can be served based upon the data (e.g., content) extracted or identified from such files and applications, as discussed in more detail below in connection with FIG. 6.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, messaging server 120 and advertising ("ad") server 130.

One embodiment of mobile devices 102-103 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, instant messaging (IM) services, SMS services, MMS services, FTP services, voice over IP (VOIP) services, or the like. Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-102. In some embodiments, applications, such as a messaging application (e.g., Yahoo! Messenger®, Yahoo! Mail®, and the like), can be hosted by the application server 108. Thus, the application server 108 can store various types of applications and application related information including application data and user profile information. In another example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
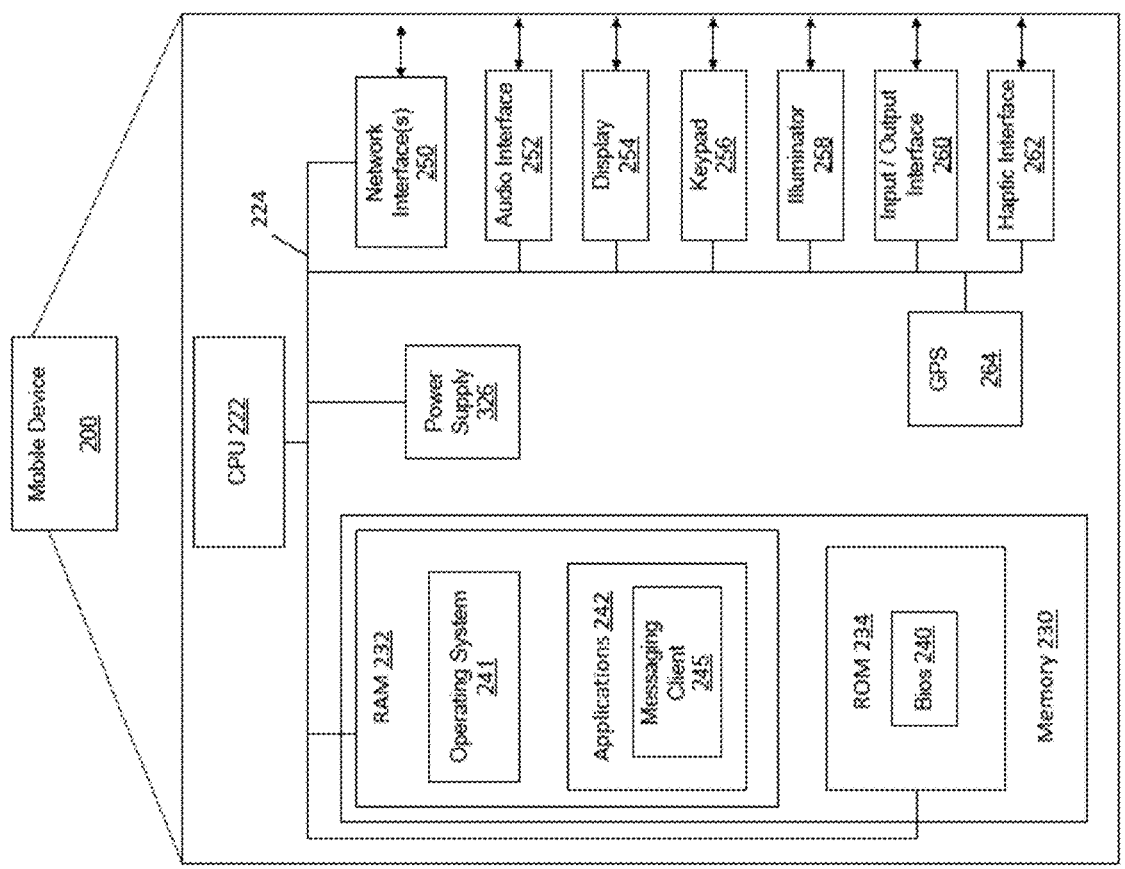
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described.

Figure 3:
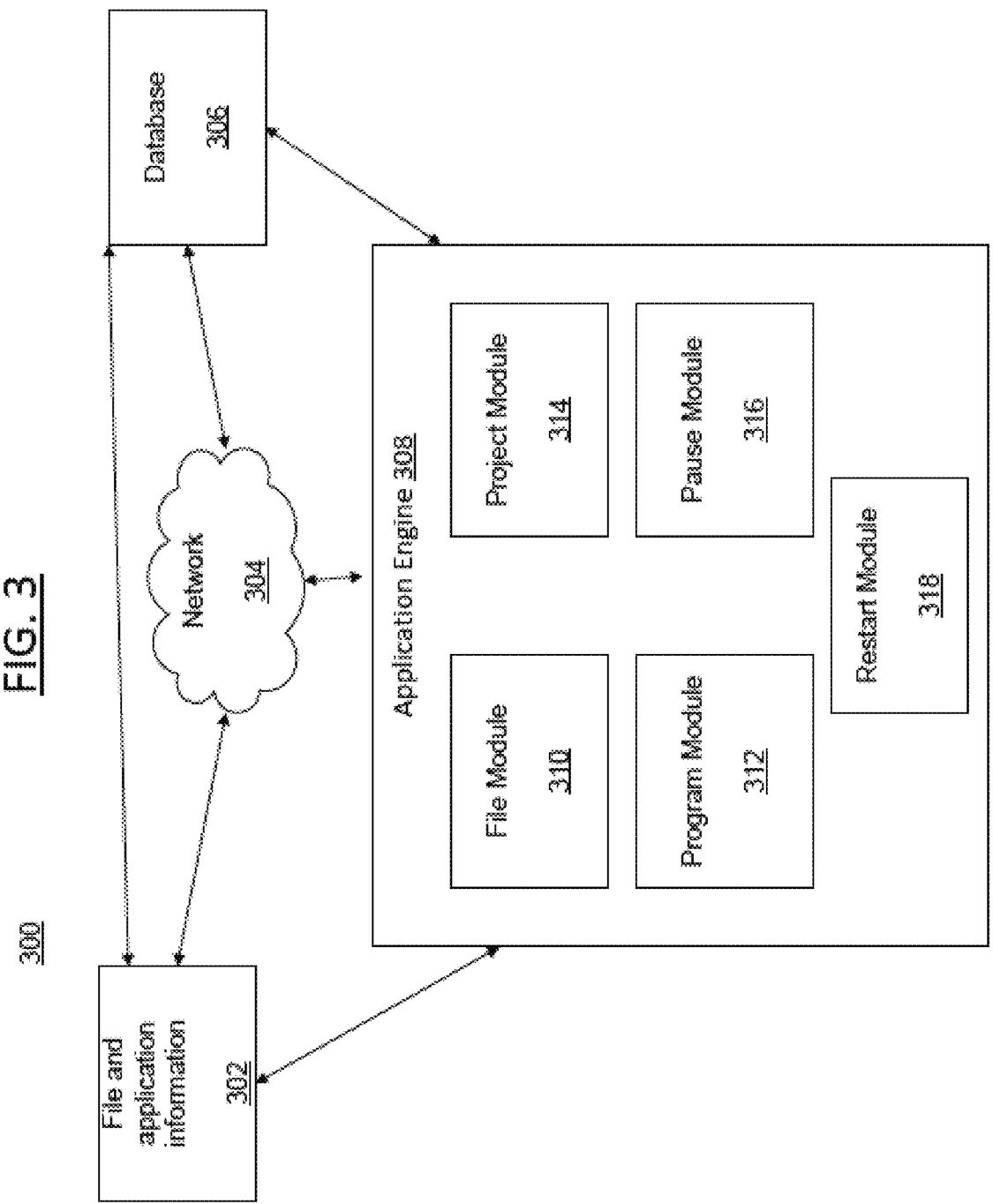
FIG. 3 is a schematic block diagram illustrating components of a system in accordance with embodiments of the present disclosure.

FIG. 3 is a block diagram illustrating the components of system 300 for performing the systems and methods discussed herein. FIG. 3 includes a file and application information 302, a network 304, an application engine 308 and a database 306 for storing the file and application information.

The application engine 308 could be hosted by a personal computing device, web server, content provider, email service provider, ad server, a user's computing device, or any combination thereof. As discussed above, the file/application information (or data) 302 that is accessed and managed by the application engine 308 can be any type of file and can include any type of data associated with an application. For example, the file/application information 302 can include data and/or metadata related to, but not limited to, any type of files, such as, but not limited to, media, voice, SMS, MMS, audio, video, multi-media, text, and the like. Such information can include, but is not limited to, the content of each file, the position within the document the user last traversed to, and/or any notes/edits the user made within the file, and the like. Examples of such messages 302 can include MS Word documents, email messages, HTML forms SMS/MMS messages, Skype® messages, Twitter® messages and other social messages, comments to an article or website, online forum posts/entries, word processing documents, help desk messages, portable document format (PDF) documents and/or other types of documents. The file/application information 302 can also application or program information related to the programs executing the files, such as, but not limited to, a word processing program, media rendering program and the like. Such information can include, but is not limited to, the user's access credentials to render the application (e.g., username/password), version, and location of the application (whether it is a web-based application or local application), and the like.

The file/application information 302 can be provided to or accessed by the application engine 308 or accessed by a computer program or device that can access the messages. In some embodiments, the messages 302 can be stored in a database of stored messages 306, which is associated with a content provider, associated with the user (either local or cloud-based storage), or the like, and/or any combination thereof. The database 306 can be any type of database or memory that can store the file/application information 302, as discussed above. Indeed, in some embodiments, the database 306 can store the file/application information 302 according to a specific project, according to a user's defined preferences, according to application preset preferences, and the like, or any combination thereof.

For purposes of the present disclosure, files as a whole are discussed within some embodiments; however, it should not be construed to limit the applications of the systems and methods discussed herein. Indeed, while reference is made throughout the instant disclosure to files, other forms of electronic documents or transmissions can be managed, stored, communicated and/or accessed and processed by the application engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the application engine 308, and the database of stored resources 306.

The principal processor, server, or combination of devices that comprises hardware programmed in accordance with the special purpose functions herein, referred to for convenience as file module 310, program module 312, project module 314, pause module 316 and restart module 318. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIG. 4.

FIG. 4 is a process 400 diagram illustrating steps performed in accordance with embodiments of the present disclosure for managing file and application information, as discussed herein. Process 400, which is performed by the application engine 308, involves analyzing the current status of open files and application the user is running (or rendering or executing), and saving information related to the current status within the umbrella of a "project" and upon an indication from the user to restart working on the "project," all of the files and applications are re-opened at the exact location (e.g., with the same status and position on the user's desktop) from when they were closed.

In some embodiments, the disclosed systems and methods can be performed from (or within) a single application platform, e.g., a locally installed application or a web-based/cloud-based application; and in some embodiments, the across multiple personal and business platforms, and the like. In some embodiments, at least some steps performed in Process 400 of FIG. 4 can be performed offline and/or online, as discussed in more detail below.

According to some embodiments, the disclosed systems and methods' application will be configured to host all applications (by way of specific administrator, system or user configuration, or by way of plug-ins or extensions that enable the instant application to run/execute all types of documents). According to some embodiments, the disclosed application may also be implemented and configured as an extension or plug-in to existing software. For example, the application may be configured as an Active-X or any other known or to be known plug-in configuration thereby enabling it to be implemented within existing software. For example, the disclosed application, as a plug-in/extension, can be implemented within software applications including, but not limited to, internet browsers, email applications and programs/platforms, word processing applications, and any other type of know or to be known document/file/media creation application/program (for example, MS Word, Excel, Powerpoint, Adobe, MS Visio, iTunes), or other types of programs where work, whether personal or work are being performed, including but not limited to: MS Outlook, Flickr, Facebook, Twitter, Instagram, and the like. Therefore, in some embodiments, when activating the disclosed program to capture and/or relaunch a project, the user can provide input to a button or other type of interface object (e.g., toolbar) that is installed in the interface of the program via installation of the application's extension/plug-in.

In one embodiment, any project may be paused and transferred to another user, with the system of the present disclosure being adapted to various enterprise software applications, allowing for the projects to be saved on a system, or cloud, with one or more users granted access able to open the project through terminal server, virtual private network, or other cloud-based access. Permissions and administrative access may be granted using the present disclosure to allow for multiple users to participate, while providing project ownership to the project leader, who may administer the project.

Figure 5A:
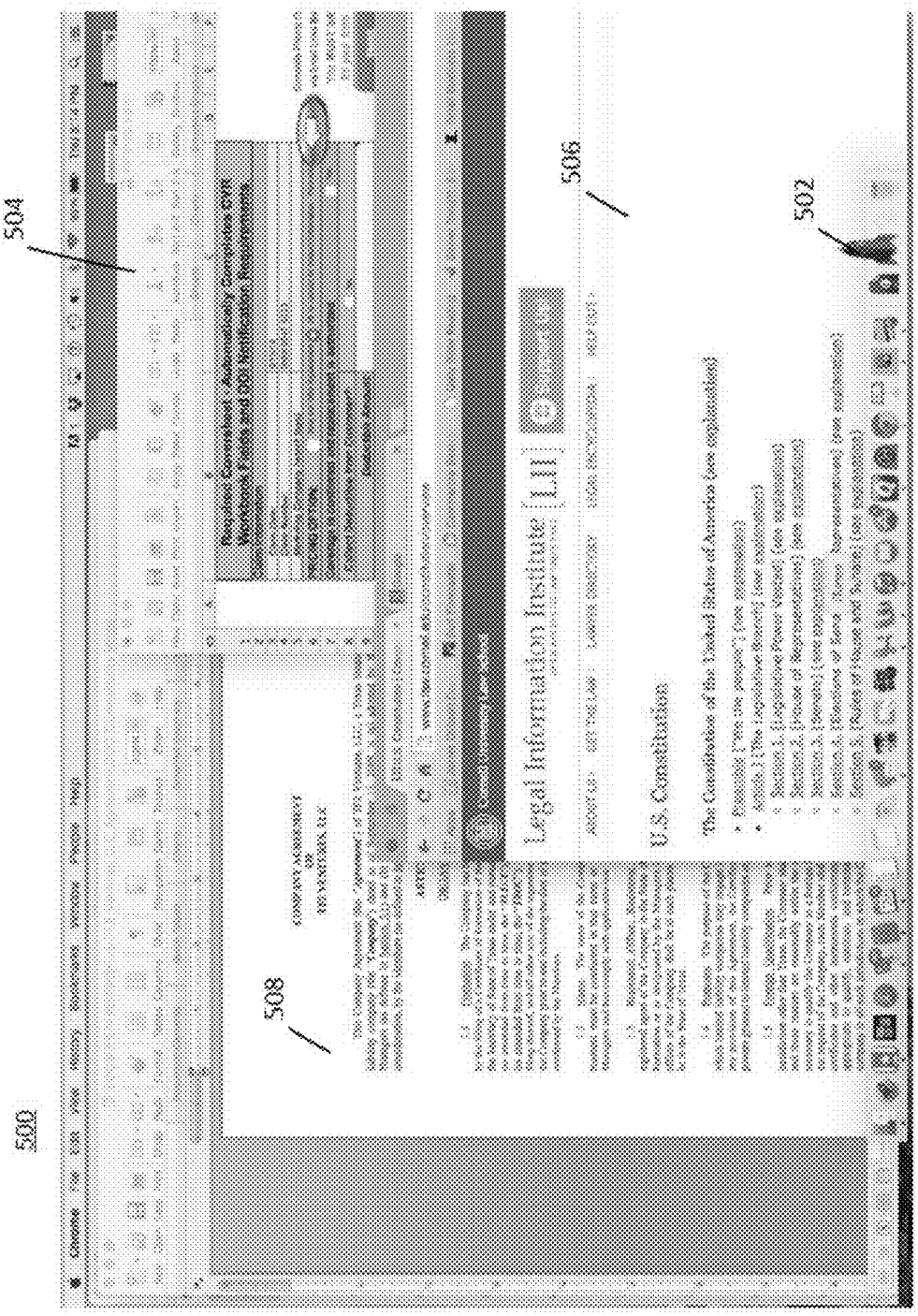
FIGS. 5A-5H illustrate non-limiting examples of embodiments of FIG. 4 in accordance with some embodiments of the present disclosure.

Process 400 beings within Step 402 where a user opens at least one file in an external application. For example, as illustrated in FIG. 5A, user A has opened on his desktop 500 three applications: a browser window 504 rendering a web page, MS Excel window 506 rendering a spreadsheet document and MS Word window 508 rendering a text file. As discussed above, the disclosed application can be executed by an icon on the user's desktop. Thus, for example, as illustrated in FIG. 5A, the application's icon 502 is illustrated in the taskbar on the desktop. It should not be construed as limiting the location of icon 502, as embodiments exist where the location, positioning and visibility of the icon can change depending on system settings, administrator settings, external application settings and user settings, or some combination thereof.

In Step 404, the user has finished working for the time being and decides to "pause" the current "project" the user is working on. According to some embodiments, the "project" can include all files/programs the user currently has open. In some embodiments, the "project" can include only the files and/or programs the user designates when saving, as discussed in more detail below. Thus, as in Step 404, the user can click on the application icon 502 which triggers the application engine 308 to capture the file information and program information. The file and program information being captured (and saved) are represented by file/application information 302 from FIG. 3. As a result of the user executing the application icon 502, dialog box 510 can be displayed which enables the user to save the file/application information 302. As illustrated in FIG. 5F, and discussed above and herein, by way of non-limiting example, shown are example types of program files and program information that can be saved in the project capture discussed herein.

Figure 5B:
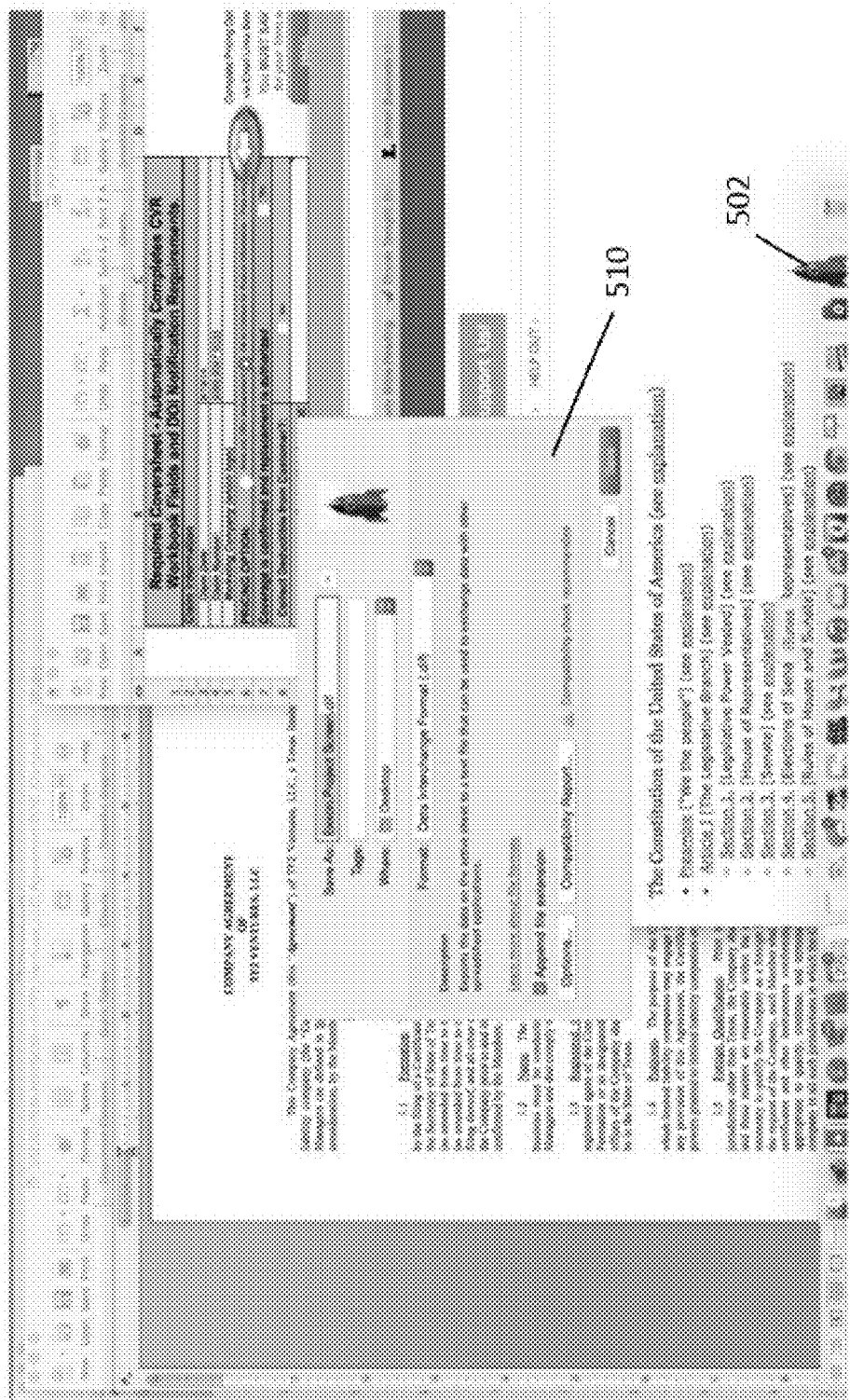

As illustrated in FIG. 5B, user A is saving information related to the files and applications from FIG. 5A: a browser window 504 rendering a web page, MS Excel window 506 rendering a spreadsheet document and MS Word window 508 rendering a text file. This saved information is saved in the datastore under a designated project, as discussed above. According to embodiments of the present disclosure, the file module 310 saves the file information, and program module 312 saves the program/application information running/executing the files. Dialog box 510 provides a quick save menu that enables the user to save such information either locally or on the cloud, as discussed above. Such saving of the file/application information includes saving such information as a project. Such saving is implemented by execution of the project module 314. In some embodiments, as discussed above, the user here can select if he/she desires to have all the files and/or program information saved in a project(s), and/or select only a portion of the file/program information.

According to some embodiments, the saving of the "project" windows can be via a single-touch input, whereby when a user toggles the icon 502, the application engine 308 can capture all files and program information presently opened on the screen. In some embodiments, such capture can be based only on files and applications opened on the desktop, regardless if they are minimized. In some embodiments, the capture may only save information for files and programs for programs maximized or visible on the screen, even if they are in the background or covered by another window (e.g., if they are not minimized). In other embodiments, the saving of a project may occur by opening a window providing optional project or session naming and window/file selection, navigating the user through file capture and saved project/session management.

Figure 5C:
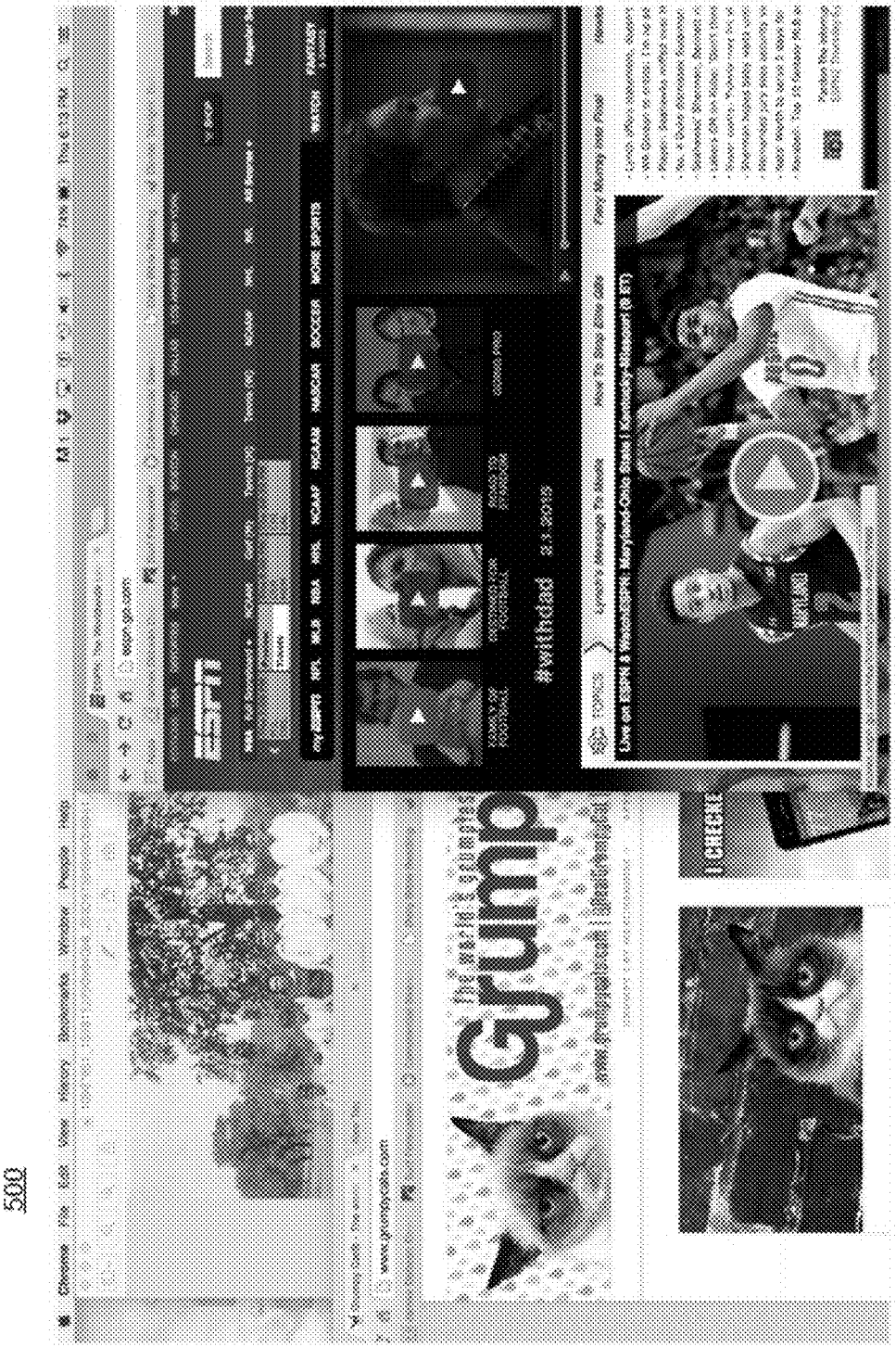

In Step 406, after the information is saved by executing the disclosed application, all the programs and files are closed. Steps 404-406 can be performed by the pause module 316. As depicted in FIG. 5C, the previously displayed windows on the desktop 500 are now closed and other windows populate the display interface of the desktop. It should be noted that the application icon 502 can remain visible thereby enabling the user to re-open (or "un-pause") the project and begin working where the user left off.

Figure 5D:
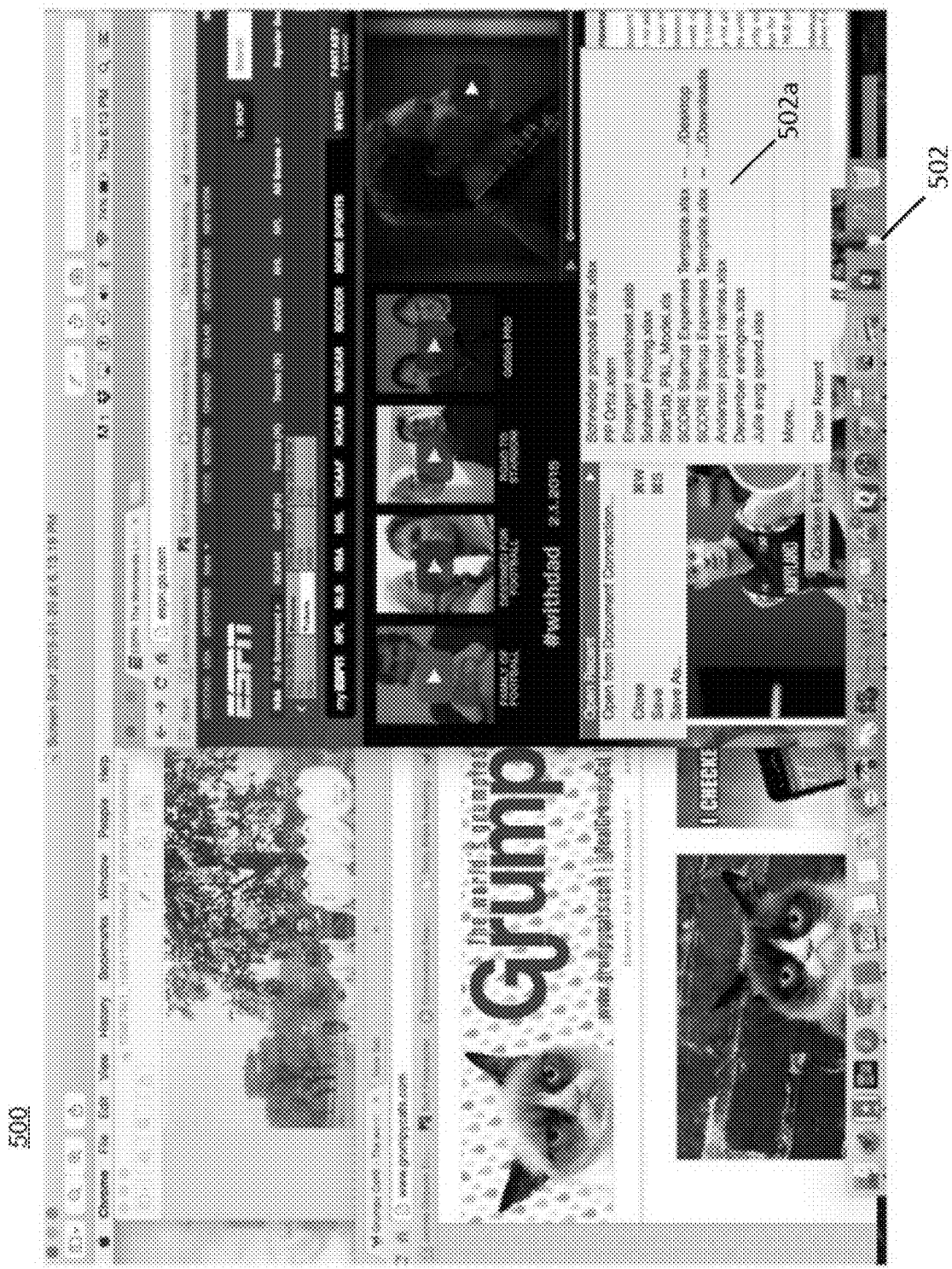
Figure 5E:
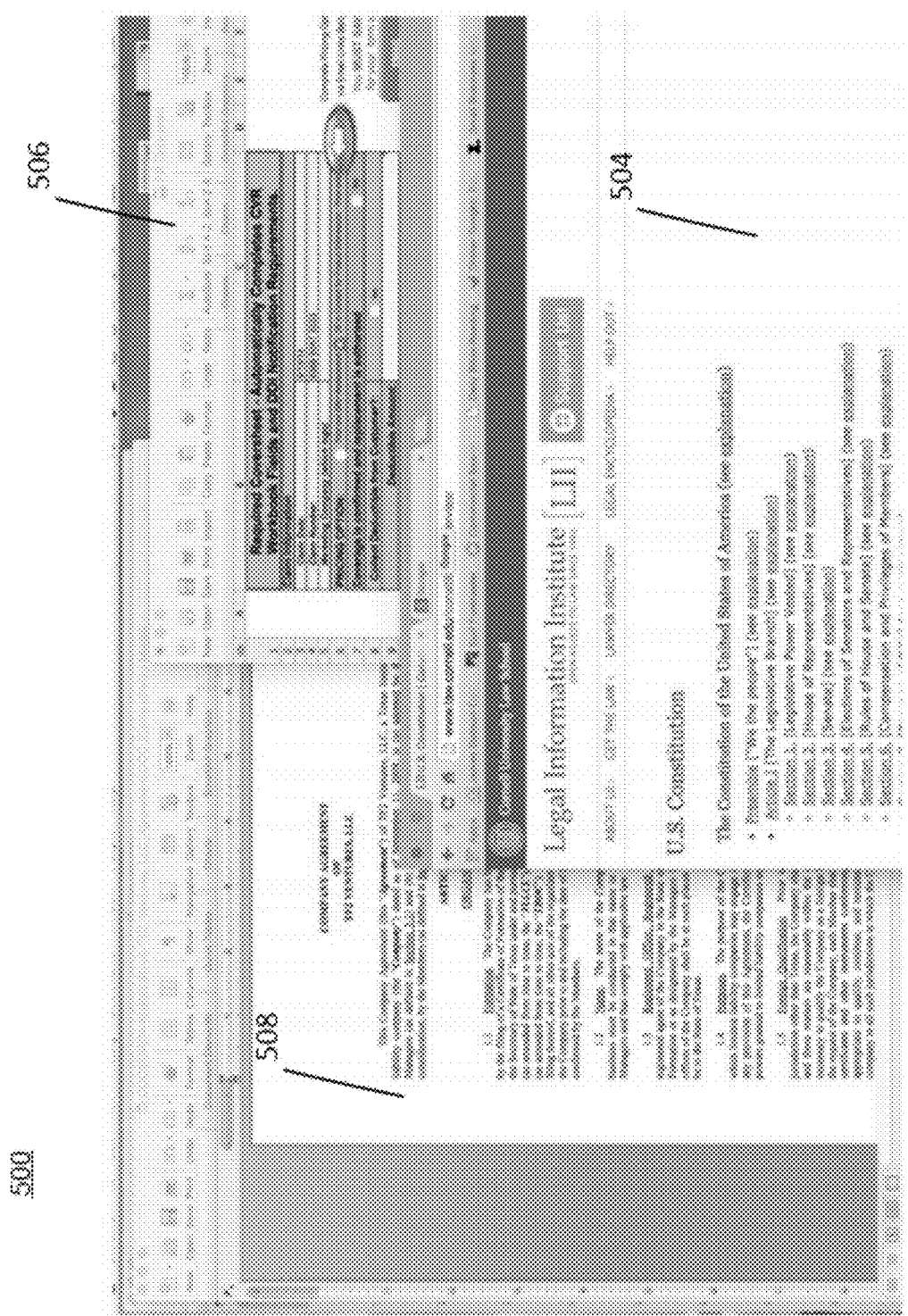
Figure 5F:
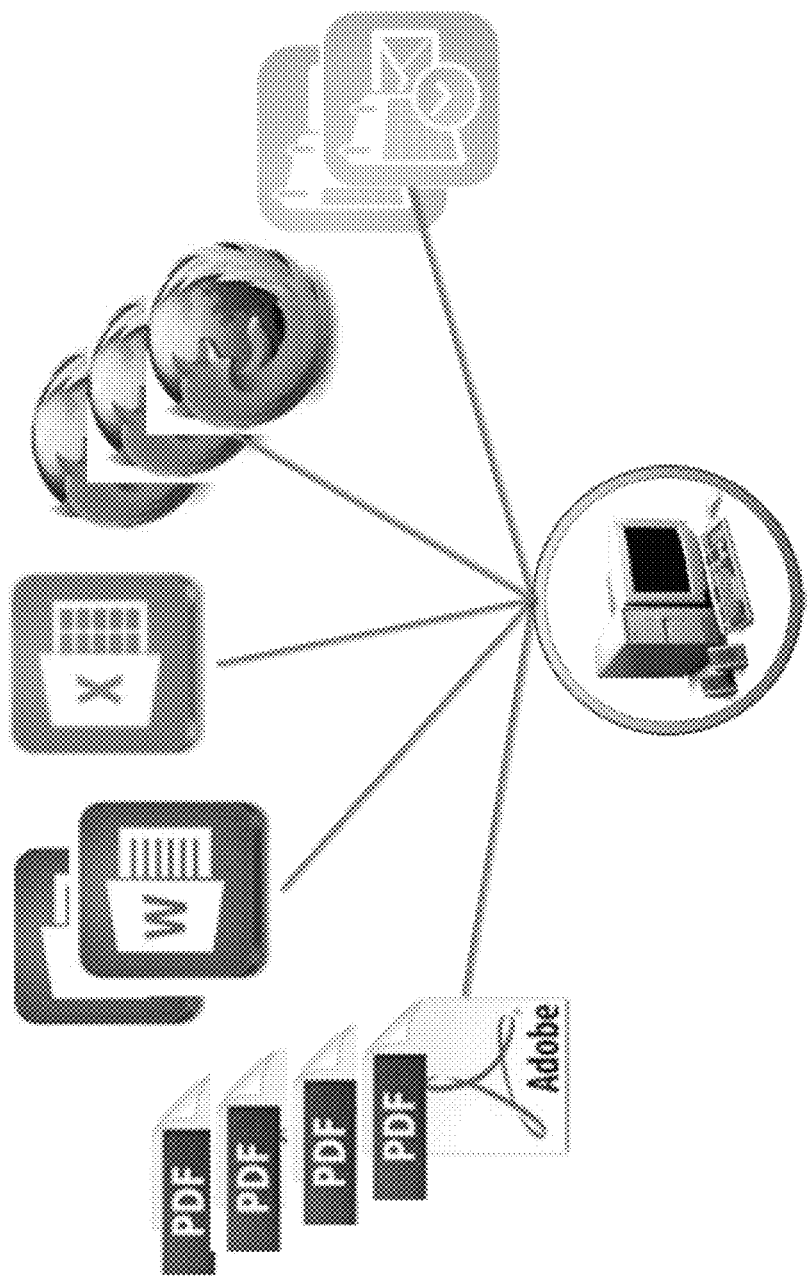

That is, as illustrated in FIG. 5D and in Step 408, the user again toggles the icon 502 which enables the user to select from saved projects. This is performed by the restart module 318. According to embodiments of the present disclosure, when the user effectuates an input on the icon 502, the user can be presented via a pop-up screen or menu that enables the user to select a project—menu 502a. Upon the user selecting a project from menu 502a, the project is reloaded and repopulates the user's desktop, as illustrated in FIG. 5E. Step 410.

Figure 5G:
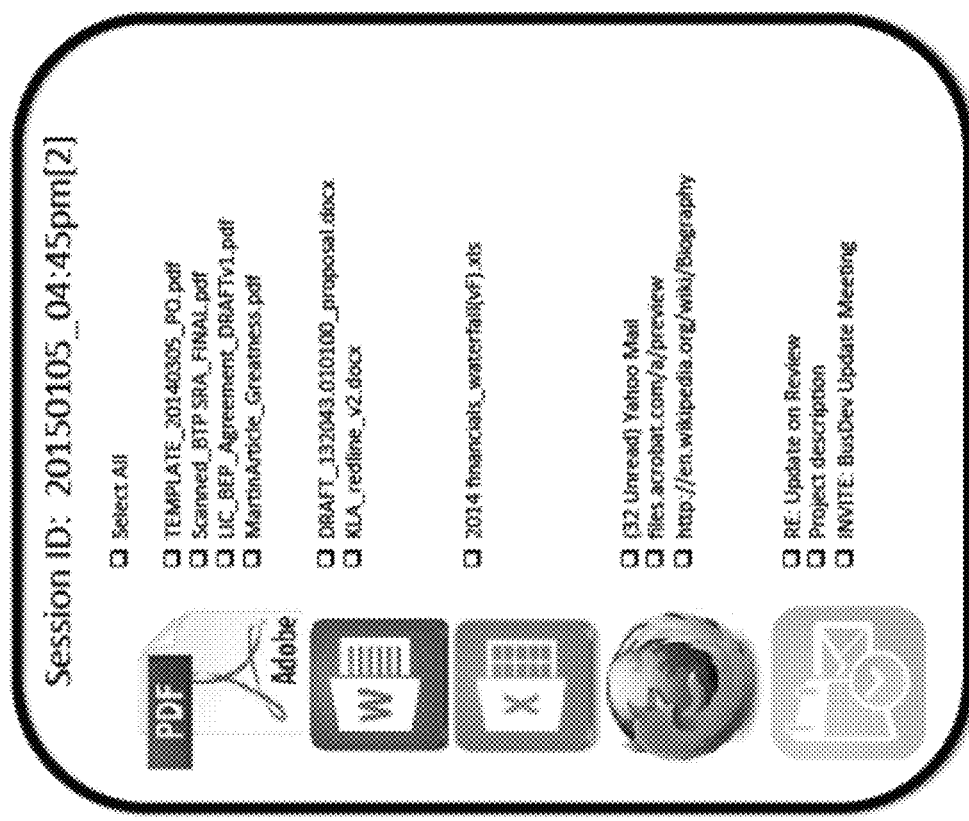
Figure 5H:
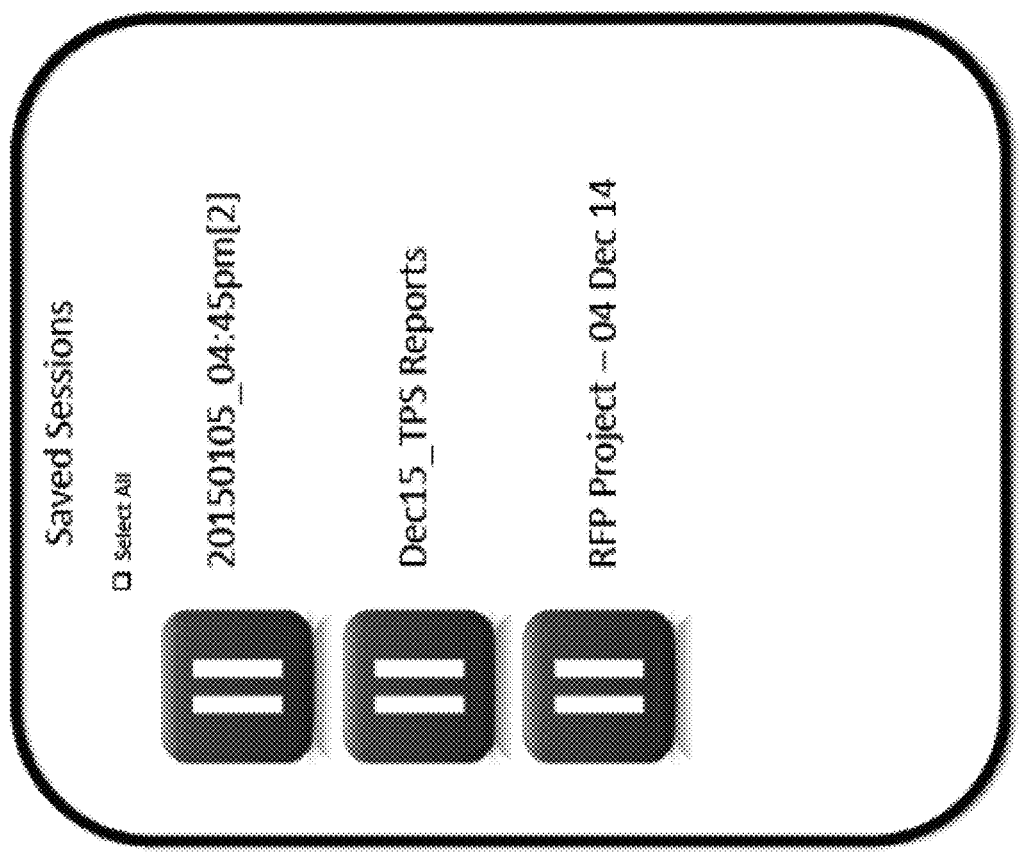

By way of a non-limiting example, as illustrated in FIGS. 5A-5H and discussed above in reference to Steps 402-410: user A had open 3 windows: windows 504, 506 and 508. The user "paused" the project by saving such information as follows: information related to the positioning of the windows on the desktop 500 (the windows size and location on the desktop), the type of windows that were opened (e.g., application/program type), the files that were loaded in each window, the location of the document when closed, and the like. In some embodiments, projects may also be time-stamped to allow retrieval of an environment that may deteriorate over time. This information was saved by the disclosed application as a "project." FIG. 5F illustrates a typical environment with multiple applications and programs running. Within each application, multiple files may be open, providing the user with access to multiple sources of information or working documents intended as deliverables, or work product. As discussed above, such saving can be local or remote. FIG. 5G illustrates an exemplary screen of the present disclosure, wherein an automatic session ID is named, which may further be edited by the user for desired session naming convention. The list of programs and applications are identified and presented. In one embodiment, the user is allowed to select from the roster of files and applications the desired files or applications to be saved within the session. As such, the user could then, at a later time, either on the same computer, or on a remote computer, re-load (or un-pause) the project, thereby resuming the work he was previously performing. FIG. 5H provides a list of saved projects represented by one embodiment of the present disclosure, each of which may be selected to restore the applicable project session and the related programs, applications and files related to the project session. Upon resuming his/her work, the same windows, window positions, files, file positions and edits and all other types of information will be redisplayed as if the user never stopped working. According to some embodiments, a user can also switch between projects in a similar manner as discussed above.

FIG. 6 is a workflow 600 of serving relevant advertisements based on the extracted data from file/application information 302 stored in database 306 for a project. Specifically, FIG. 6 illustrates how advertisements are served to users based on the content the user is working on. In Step

602, content extracted from a file and/or application is identified. In some embodiments, the content (or context) can be extracted based on only opened files and applications, and in some embodiments, the content can be extracted based on the stored file/application information.

For example, if user A is student and is writing a paper about his recent trip to Italy. User A has open on his desktop a browser window that is showing content from a Wikipedia® page for Rome. Thus, the extracted context can identify data for Rome, Italy. In some embodiments, the extraction of a context can account for where the user has traversed on the page. For example, if the user has traversed down the page to the content related to the Vatican, and the user executed the application and stores the file/application 302 information delegating this positioning of the web page as the restart portion when re-opening the application/file, then the disclosed systems and methods can identify the displayed portions of the file running within the application and use such displayed portion as the content to derived the extracted context. Step 602.

In Step 604, the content (or content data) is communicated (or shared) from the application to an advertisement platform, which comprise an ad server 130 and associated ad database. Upon receipt of the content data, the advertisement server 130 performs a search for a relevant advertisement within the associated advertisement database. The search for an advertisement is based at least on the extracted content.

In Step 604, the advertisement server 130 searches the advertisement database for advertisements that match the identified (and extracted) content. In Step 606, an advertisement is selected (or retrieved) based on the results of Step 604. In some embodiments, the advertisement can be selected based upon the result of Step 604, and modified to conform to attributes of the page, file or application upon which the advertisement will be displayed, and/or to the device for which it will be displayed. In some embodiments, as in Step 608, the selected advertisement is shared or communicated via the application. In some alternative embodiments, the selected advertisement is sent directly to each user's computing device. In some embodiments, the advertisements may be sent to the user only when the project, or disclosed application is open.

By way of a non-limiting example, from the above Rome example, ads can be selected to provide advertisements or promotions for deals in the identified destination city— Rome, or ads for future airline discounts/deals for trips to Rome, for example. In another embodiment, monetization of data obtained by user behavior, including but not limited to, program usage, project size parameters, time spent, the nature of the project(s) in relation to the programs used, user preferences and settings, and the like. Data aggregation through session or project statistics may be provided based on collective project activities.

As shown in FIG. 7, internal architecture 700 includes one or more processing units, processors, or processing cores, (also referred to herein as CPUs) 712, which interface with at least one computer bus 702. Also interfacing with computer bus 702 are computer readable medium, or media, 705, network interface 714, memory 704, e.g., random access memory (RAM), run-time transient memory, read only memory (ROM), media disk drive interface 720 as an interface for a drive that can read and/or write to media including removable media such as floppy, CD ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

Figure 8:
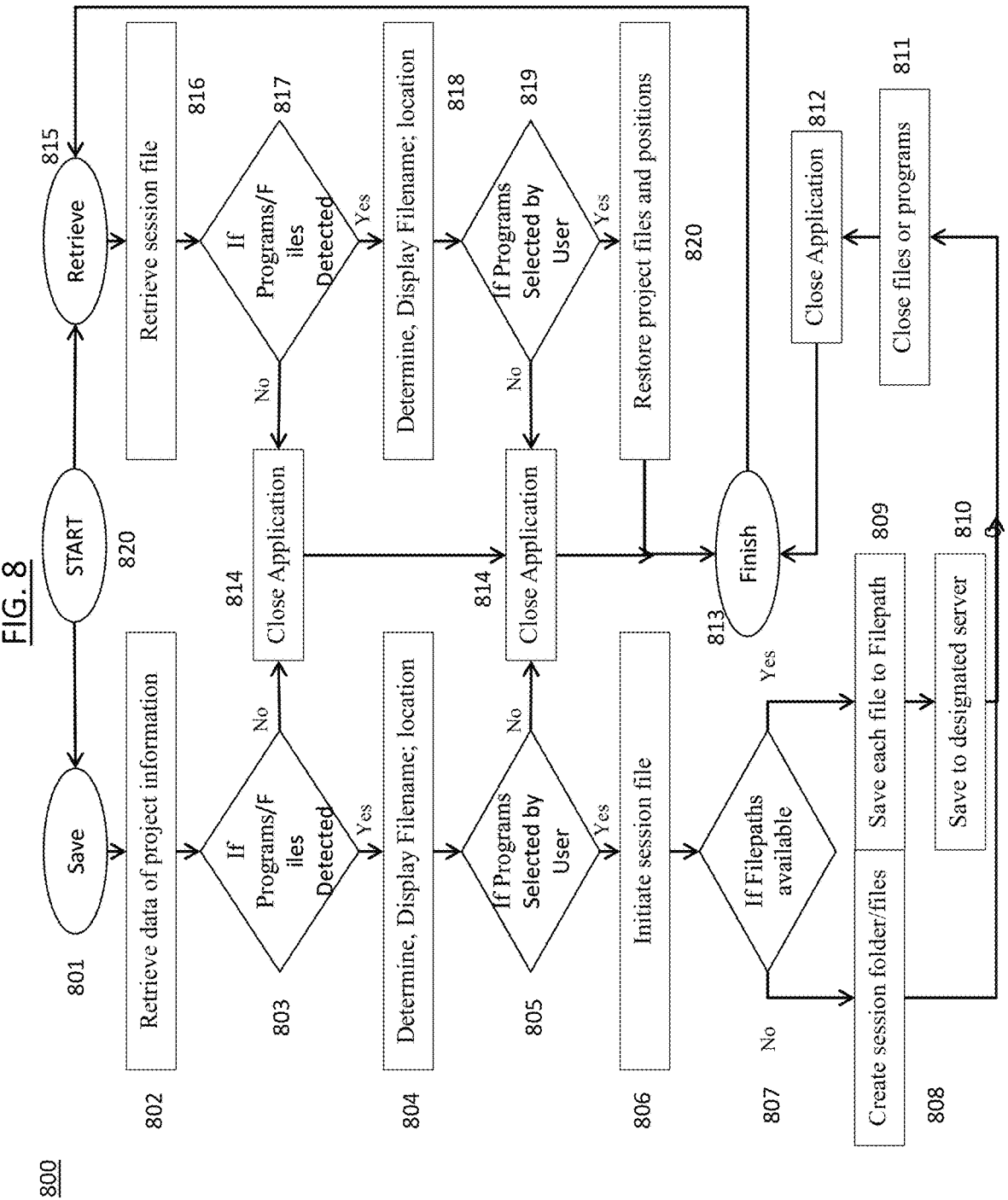
FIG. 8 is a flowchart illustrating the steps performed in accordance with some embodiments of the present disclosure

As shown in FIG. 8, a workflow algorithm 800 of the present disclosure. Step 820 initiates the command of the system to activate a save feature 801, wherein data related to the project session is retrieved 802. In the event no program files are detected, the system closes 814. In the event program files are detected 803 the determination and display of the filename 804 occurs via the user interface. Addition location data with regard to the filepath may be displayed in Step 804. Upon the display of program and file information in Step 804, a user is able to select one or more files or programs 805. If no files or programs are selected the system closes 814. If files or programs are selected a session file is initiated 806, providing identification of the particular session, either via default settings or via user command. The session file 806 further determines via the network and communication interface the filepaths of the selected files or programs. Centralized server systems may be accessed, provided the system is allowed access via security settings. The system saves the selected files to the filepath 809 and selected server 810, and may be selected to replace previous versions or save as new versions. In the event filepaths are not available 807, a separate session folder 808 may be created within the system in order to hold the selected programs or files in the saved state per the session. Following saving of the selected files or programs 808, 809, 810, the files or programs may be closed 811. The system of the present disclosure may then be closed 812, and considered finished 813. The closed system containing instructions for the selected files or programs may then be retrieved 815 by activation of the system to start 820. Upon a user selecting to retrieve a previously saved session file 816, the system determines saved programs or files 817. If none are detected, the system closes 814. If programs or files are detected the session's previously selected programs or files 805 are then re-presented 818 into a display listing the filenames and locations. The user may select the files or programs for re-presentation 819. Upon selection, the system restores the session project files and positions with regard to the display interface 820. The system may then finish 813.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:
   identifying, via a computing device, a set of applications and files, said files currently opened and running via said applications, said set of applications being user-initiated and executing on a first client device of a user, each application of the applications being an external application to an operating system (OS) running on said first client device, wherein the applications and files are included in a project that is worked by a plurality of users;
   receiving, by the computing device, an instruction from said first client device indicating that the user has stopped working on said files within said applications;
   executing, via the computing device, upon the receiving said instruction, an application program, said execution of the application program causing the application program to store portable information related to a user-selected subset of the set of applications and portable information related to a user-selected portion of said files in a database on a network, said user-selected subset of applications being only a portion of the set of applications, the user-selected subset of files being a portion of the files operating on said each application of the applications, said portable information comprising data, specific to said first client device, related to i) a status of said each application of the applications and said each file of the files in each subset, ii) an identity of said each application of the applications and said each file of the files in each subset, and iii) a current progress within said each file of the files within each subset at a time said instruction is received;

extracting, by the computing device, content associated with the current progress of at least one file from the stored portable information, the extracted content being displayed at the time said instruction was received;

identifying, by the computing device, related content to the extracted content;

receiving, by the computing device, a request from the user from a second client device, said second client device being a different device than the first client device;

retrieving, via the application program executing on the computing device, over the network, said stored portable information upon receiving said request; and communicating, via the computing device, said retrieved information and the identified related content to said second client device, said communication causing said second client device to load each subset of the set of applications and files, said caused loading of each subset of the applications and files causing the subset of applications to be executed on the second client device and each the of the files in the subset of applications to be opened on said second client device according to said data specific to said first client device, such that said each file in the subset of applications is opened in relation to said status and at said current progress at the time said instruction was received, said communication further causing the identified related content to be displayed in conjunction with the at least one file from which the content was extracted from; and restoring the applications related to the project when the files are redisplayed.

2. The method of claim 1, wherein said execution of the application program is effectuated by the user providing an input on the first client device running the application program.

3. The method of claim 1, wherein said applications are web-based applications executing over the network on said first client device.

4. The method of claim 1, wherein said applications are locally executed applications that are installed and executed by the first client device.

5. The method of claim 1, wherein said instruction from said first client device causes the applications and files to be closed on said first client device.

6. The method of claim 1, wherein said application program executes on said first client device, said first client device execution causing the information to be transmitted to said computing device for storage.

7. The method of claim 6, wherein said second client device opens and executes said application program causing said loading of said applications and files.

8. The method of claim 1, wherein said second client device is a same device as the first client device.

9. A non-transitory computer-readable storage medium tangibly encoded with computer-executable instructions, that when executed by a processor associated with a computing device, perform a method comprising:

identifying, via the computing device, a set of applications and files, said files currently opened and running via said applications, said set of applications being user-initiated and executing on a first client device of a user, each application of the applications being an external application to an operating system (OS) running on said first client device, wherein the applications and files are included in a project that is worked by a plurality of users;

receiving, by the computing device, an instruction from said first client device indicating that the user has stopped working on said files within said applications;

executing, via the computing device, upon the receiving said instruction, an application program, said execution of the application program causing the application program to store portable information related to a user-selected subset of the set of applications and portable information related to a user-selected portion of said files in a database on a network, said user-selected subset of applications being only a portion of the set of applications, the user-selected subset of files being a portion of the files operating on said each application of the applications, said portable information comprising data, specific to said first client device, related to i) a status of said each application of the applications and said each file of the files in each subset, ii) an identity of said each application of the applications and said each file of the files in each subset, and iii) a current progress within said each file of the files within each subset at a time said instruction is received;

extracting, by the computing device, content associated with the current progress of at least one file from the stored portable information, the extracted content being displayed at the time said instruction was received;

identifying, by the computing device, related content to the extracted content;

receiving, by the computing device, a request from the user from a second client device, said second client device being a different device than the first client device;

retrieving, via the application program executing on the computing device, over the network, said stored portable information upon receiving said request; and communicating, via the computing device, said retrieved information and the identified related content to said second client device, said communication causing said second client device to load each subset of the set of applications and files, said caused loading of each subset of the applications and files causing the subset of applications to be executed on the second client device and each the of the files in the subset of applications to be opened on said second client device according to said data specific to said first client device, such that said each file in the subset of applications is opened in relation to said status and at said current progress at the time said instruction was received, said communication further causing the identified related content to be displayed in conjunction with the at least one file from which the content was extracted from: and restoring the applications related to the project when the files are redisplayed.

10. A device comprising:
a processor; and a non-transitory computer-readable storage medium for tangibly storing thereon program logic for execution by the processor, the program logic comprising:
logic executed by the processor for identifying, via a computing device, a set of applications and files, said files currently opened and running via said applications, said set of applications being user-initiated and executing on a first client device of a user, each application of the applications being an external application to an operating system (OS) running on said first client device, wherein the applications and files are included in a project that is worked by a plurality of users;
logic executed by the processor for receiving, by the computing device, an instruction from said first client device indicating that the user has stopped working on said files within said applications;
logic executed by the processor for executing, via the computing device, upon the receiving said instruction, an application program, said execution of the application program causing the application program to store portable information related to a user-selected subset of the set of applications and portable information related to a user-selected portion of said files in a database on a network, said user-selected subset of applications being only a portion of the set of applications, the user-selected subset of files being a portion of the files operating on said each application of the applications, said portable information comprising data, specific to said first client device, related to i) a status of said each application of the applications and said each file of the files in each subset, ii) an identity of said each application of the applications and said each file of the files in each subset, and iii) a current progress within said each file of the files within each subset at a time said instruction is received;
logic executed by the processor for extracting, by the computing device, content associated with the current progress of at least one file from the stored portable information, the extracted content being displayed at the time said instruction was received;
logic executed by the processor for identifying, by the computing device, related content to the extracted content;
logic executed by the processor for receiving, by the computing device, a request from the user from a second client device, said second client device being a different device than the first client device;
logic executed by the processor for retrieving, via the application program executing on the computing device, over the network, said stored portable information upon receiving said request; and
logic executed by the processor for communicating, via the computing device, said retrieved information and the identified related content to said second client device, said communication causing said second client device to load each subset of the set of applications and files, said caused loading of each subset of the applications and files causing the subset of applications to be executed on the second client device and each file of the files in the subset of applications to be opened on said second client device according to said data specific to said first client device, such that said each file in the subset of applications is opened in relation to said status and at said current progress at the time said instruction was received, said communication further causing the identified related content to be displayed in conjunction with the at least one file from which the content was extracted from; and
logic executed by the processor for restoring, via the computing device, the applications related to the project when the files are redisplayed.

* * * * *